United States Patent
Hsieh

(10) Patent No.: US 6,659,417 B2
(45) Date of Patent: Dec. 9, 2003

(54) ELEVATING DEVICE FOR ADJUSTING A TELESCOPIC TUBE USED TO SUPPORT A MUSICAL INSTRUMENT

(76) Inventor: Wu-Hong Hsieh, No. 162, Chung Shan 2nd Rd., Lu Chou City, Taipei Hsien (TW)

(*) Notice: Subject to any disclaimer, the term of this patent is extended or adjusted under 35 U.S.C. 154(b) by 0 days.

(21) Appl. No.: 10/095,044

(22) Filed: Mar. 12, 2002

(65) Prior Publication Data

US 2003/0173475 A1 Sep. 18, 2003

(51) Int. Cl.$^7$ ............................................. F16M 11/00
(52) U.S. Cl. .......................... 248/404; 84/421; 248/422
(58) Field of Search .................................. 248/161, 132, 248/404, 422, 125.1; 84/421, 422.3

(56) References Cited

U.S. PATENT DOCUMENTS

| | | | | |
|---|---|---|---|---|
| 3,996,927 A | * | 12/1976 | Frank ........................ 600/486 |
| 5,385,323 A | * | 1/1995 | Garelick ..................... 248/161 |
| 6,189,843 B1 | * | 2/2001 | Pfister ........................ 248/161 |
| 6,279,860 B1 | * | 8/2001 | Swanger .................. 248/125.2 |
| 6,450,462 B1 | * | 9/2002 | Hsieh ...................... 248/125.1 |

* cited by examiner

Primary Examiner—Ramon O. Ramirez
(74) Attorney, Agent, or Firm—Rosenberg, Klein & Lee

(57) ABSTRACT

An elevating device includes a casing with an upper opening defined to allow the upper tube to extend into the casing and a lower opening defined to communicate with the upper opening and allow the lower tube to extend into the casing, a worm gear rotatably received in the casing to mesh the rack of the upper tube, and a worm shaft extending into the casing to mesh the worm gear so as to drive the movement of the upper tube relative to the lower tube.

3 Claims, 5 Drawing Sheets

ELEVATING DEVICE FOR ADJUSTING A TELESCOPIC TUBE USED TO SUPPORT A MUSICAL INSTRUMENT

BACKGROUND OF THE INVENTION

1. Field of the Invention

The present invention relates to an elevating device, and more particularly to an elevating device for adjusting the relative position of a telescopic tube which is used to support thereon a musical instrument.

2. Description of Related Art

A musical instrument, e.g., a drum, a cymbal, usually is supported by a telescopic tube placed on a floor. A clamp for such a telescopic tube is shown in FIG. 5. However, due to the variations of the users' arm lengths, heights and the limitations from the site where the instruments are installed, the user will have to adjust the telescopic tube so as to meet different requirements. When the adjustment is required, the user normally grasps the upper tube (51) and then unscrews the adjusting knob (615) so as to loosen the clamp (613) to the upper tube (51). During the entire unscrewing process, the user's hand can not leave the upper tube (51) or the upper tube (51) will slide into the lower tube (52), which at least causes damage to the instrument supported by the upper tube (51). Therefore, the user has to keep both hands working on the adjustment of the upper and lower tubes (51,52)

To overcome the shortcomings, the present invention tends to provide an improved elevating device to mitigate and obviate the aforementioned problems.

SUMMARY OF THE INVENTION

The primary objective of the present invention is to provide an elevating device to adjust relative position between upper and lower tubes. The elevating device has a worm gear, a worm shaft mated with the worm gear and rack adapted to be formed on a periphery of the upper tube to mate with the worm gear so that a rotation of a handle connected to the worm shaft will thus cause the rotation of the worm gear and accordingly the movement of the upper tube to the lower tube.

Other objects, advantages and novel features of the invention will become more apparent from the following detailed description when taken in conjunction with the accompanying drawings.

DETAILED DESCRIPTION OF THE PREFERRED EMBODIMENT

Figure 1:
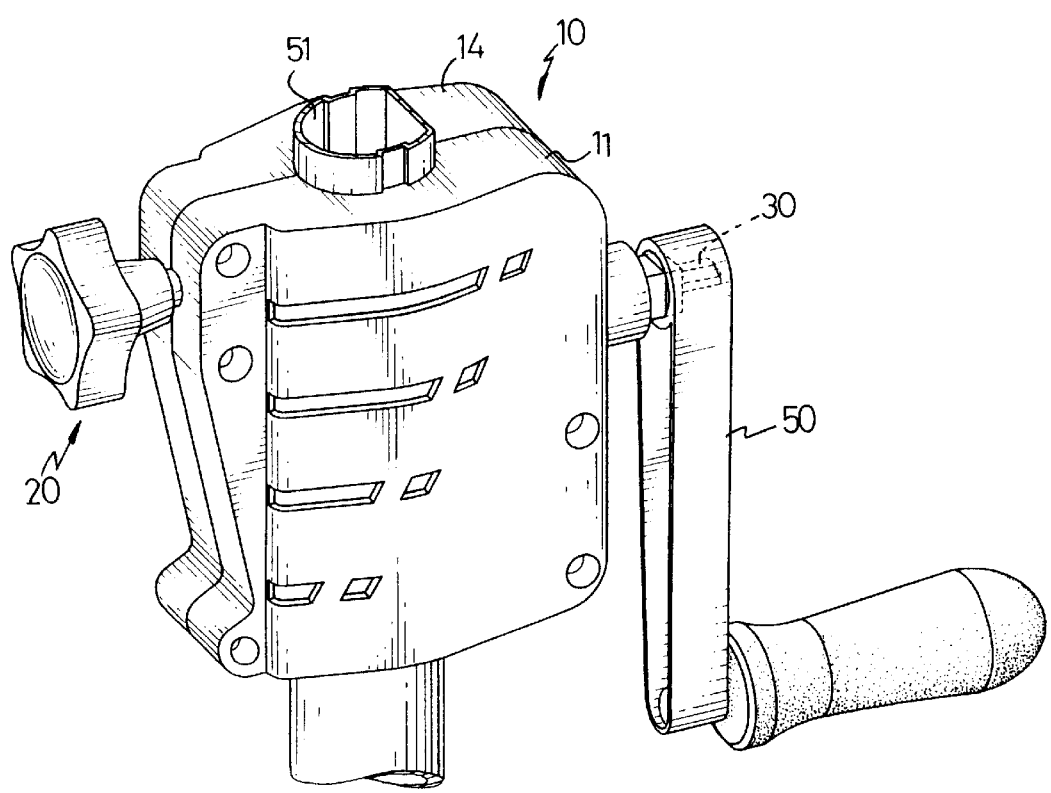
FIG. 1 is a perspective view of the elevating device adapted to mate with the lower tube and upper tube.
Figure 2:
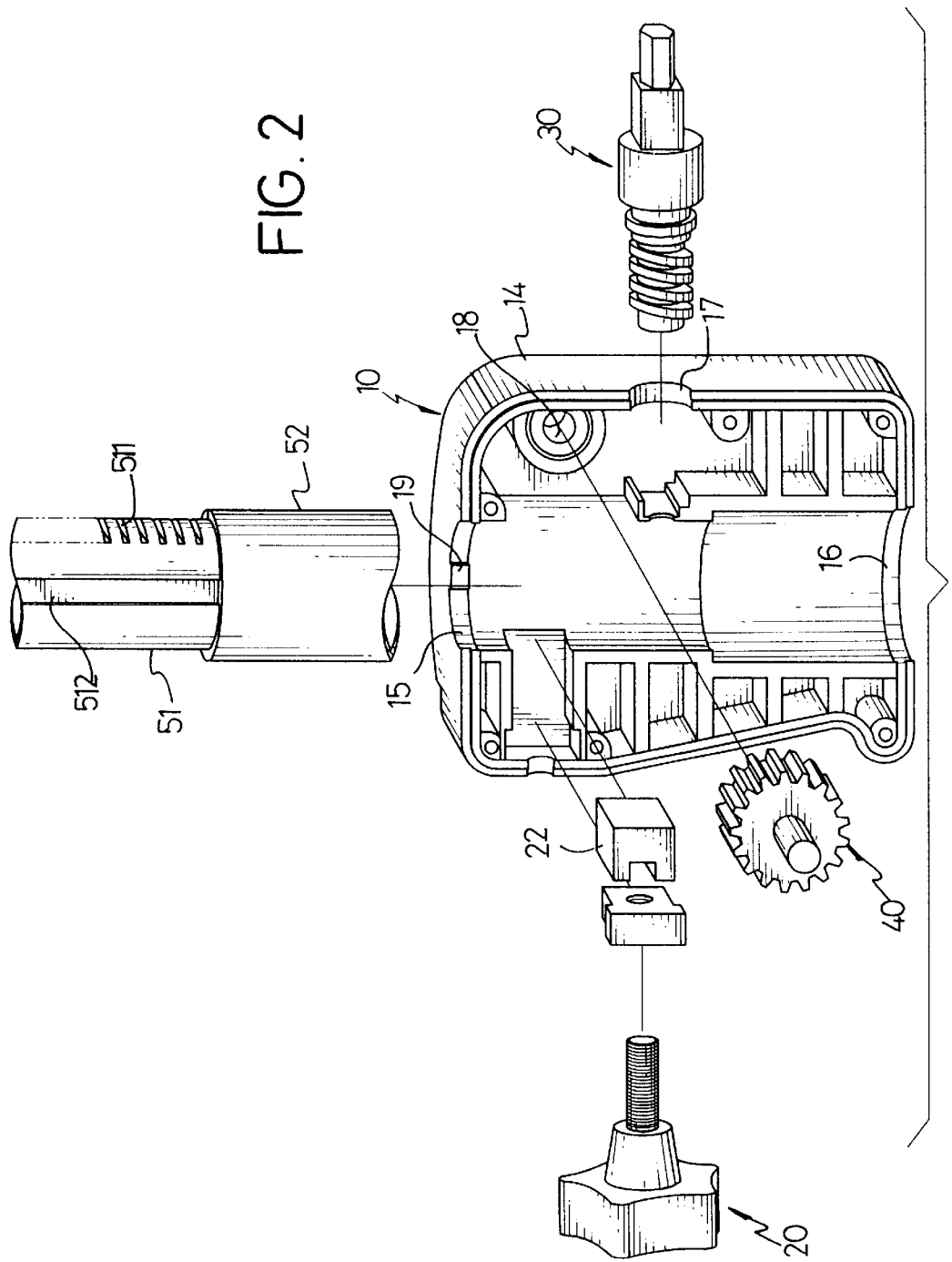
FIG. 2 is an exploded perspective view of the elevating device, wherein for clarity, the front casing of the device is removed.

With reference to FIGS. 1 and 2, the elevating device constructed in accordance with the present invention has a casing (10), an adjusting knob (20), a worm shaft (30), a worm gear (40) and a handle (50).

The casing (10) is composed of a front casing (11) and a rear casing (14) complementarily corresponding to the front casing (11) so as to define therebetween a space (not numbered). The casing (10) further has an upper opening (15) defined to allow the extension of an upper tube (51) and a lower opening (16) communicating with the upper opening (15) and defined to allow the extension of a lower tube (52).

The casing (10) is further provided with a hole (17) defined in a side face of the casing (10) to correspond to the worm shaft (30) whereby the worm shaft (30) is able to extend through the hole (17) and into the interior of the casing (10). A seat (18) is formed in an inner face of the rear casing (14) to correspond to the worm gear (40) such that the worm gear (40) is able to be rotatably mounted on the seat (18).

The adjusting knob (20) has a positioning block (22) securely provided to a distal end of the adjusting knob (20) and received inside the casing (10) so as to be detachably engaged with an outer periphery of the upper tube (51).

When the elevating device of the invention is to be assembled, the adjusting knob (20) extends into the casing (10) and has the positioning block (22) movably received inside the casing (10). The worm gear (40) is then rotatably mounted on the seat (18) and mated with the worm shaft (30) which extends into the casing (10) from the hole (17). After the casing (10) is securely engaged with an outer periphery of the lower tube (52), the upper tube (51) with a rack (511) formed on an outer periphery thereof is inserted into the casing (10) with the rack (511) mated with the worm gear (40).

Figure 3:
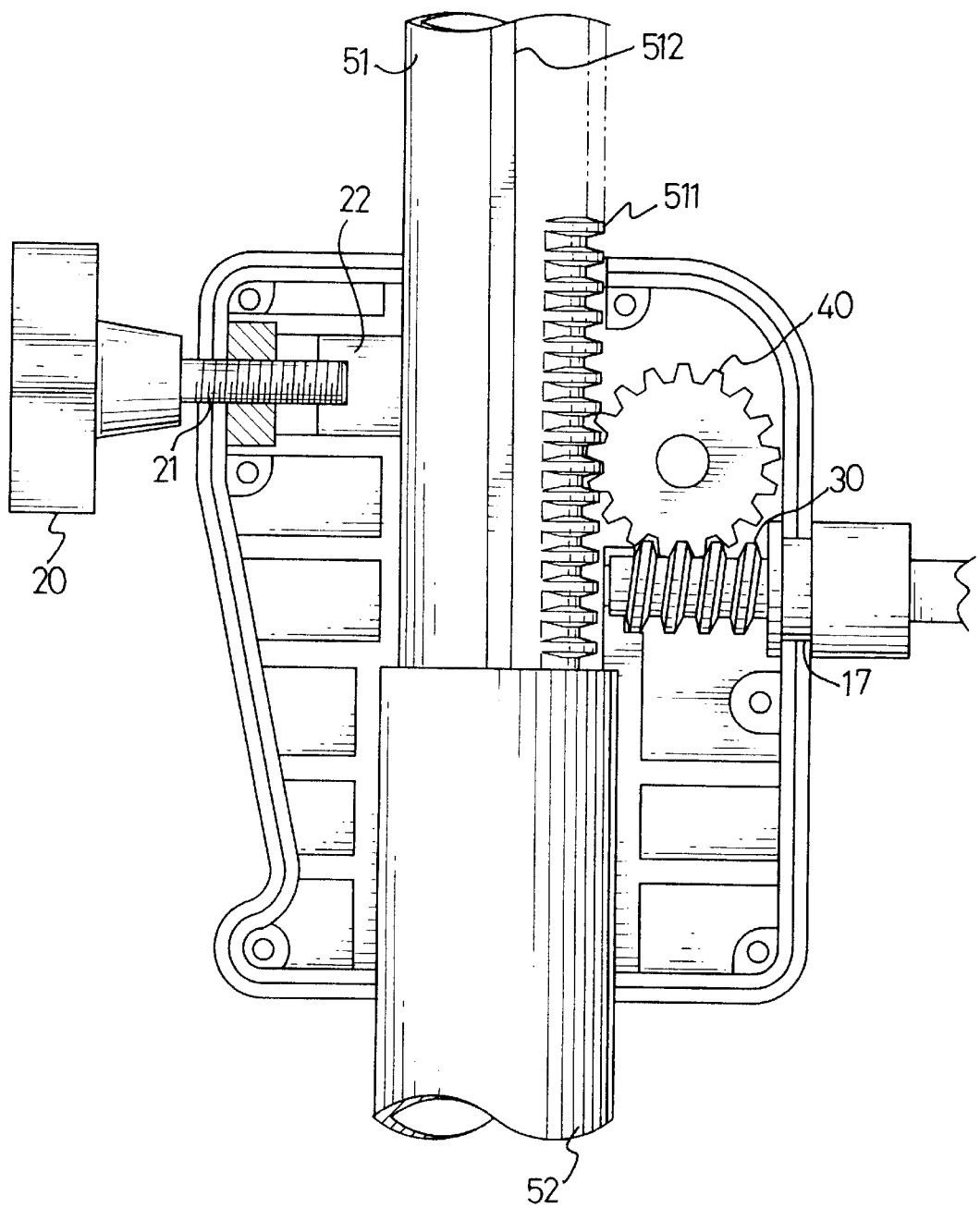
FIG. 3 is a side view showing the assembled elevating device.

With reference to FIG. 3, it is seen that the telescopic tube is composed of the upper tube (51) and the lower tube (52). Therefore, the upper tube (52) is able to freely extend into the lower tube (52).

After the meshing between the worm shaft (30) and the worm gear (40) and the meshing between the worm gear (40) and the rack (511) of the upper tube (51), a rotation of the worm shaft (30) will trigger the rotation of the worm gear (40), which causes the movement of the upper tube (51) relative to the lower tube (52). Because of the worm gear (40) and the worm shaft (30), the user is able to operate the movement of the upper tube (51) with one hand without worrying that the upper tube (51) may fall into the lower tube (52).

Referring back to FIGS. 1 and 2, in order to smoothen the movement of the upper tube (51), it is to be noted that the casing (10) has a pair of oppositely formed bosses (19) on an inner face defining the upper opening (15) and the upper tube (51) has a pair of channels (512) oppositely formed on an outer periphery of the upper tube (51) to correspond to the bosses (19), such that when in assembly, the bosses (19) are received in the corresponding channel (512). Therefore, the movement of the upper tube (51) relative to the casing (10) is smooth without any vibration or shaking due to any mechanical clearance. Then, the user mounts the handle (50) to the worm shaft (30) so that the user is able to rotate the handle (50) to control the elevation of the upper tube (51) relative to the lower tube (52). After the user adjusts the relative position of the upper tube (51) to the lower tube (52), the user rotates the adjusting knob (20) to force the positioning block (22) to move to the upper tube (51) so as to abut the outer face of the upper tube (51) to position the upper tube (51).

Figure 4:
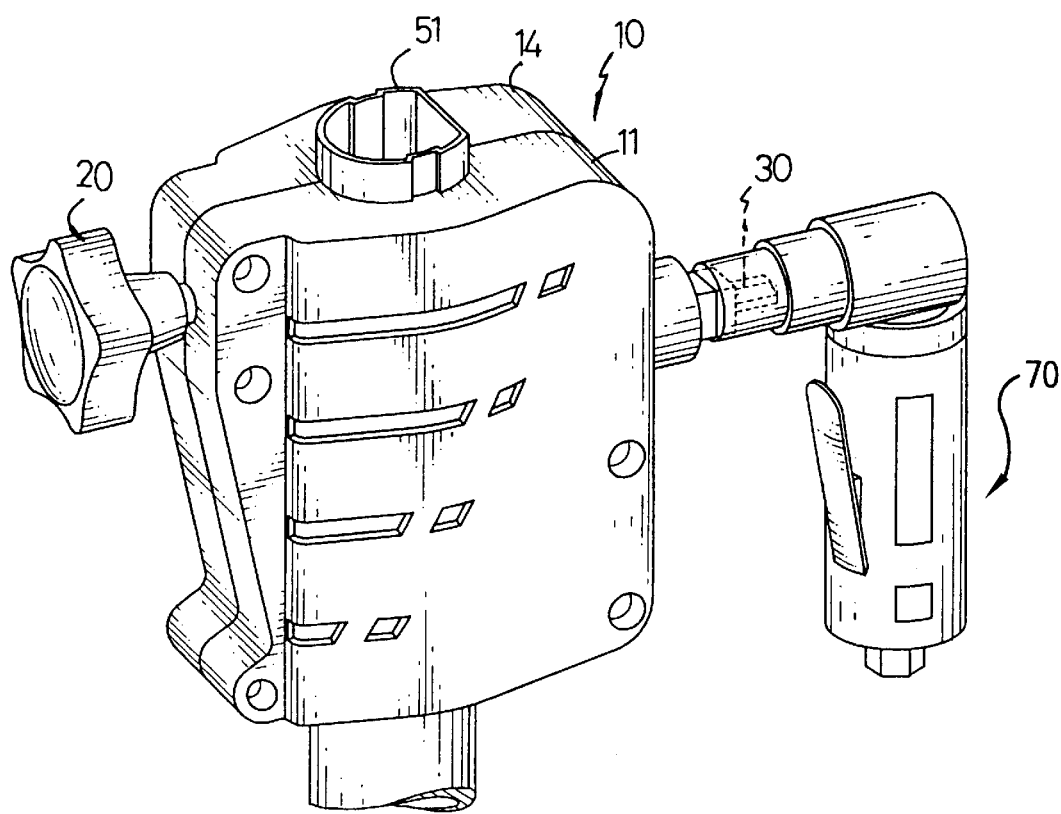
FIG. 4 is a perspective view of another preferred embodiment of the elevating device.
Figure 5:
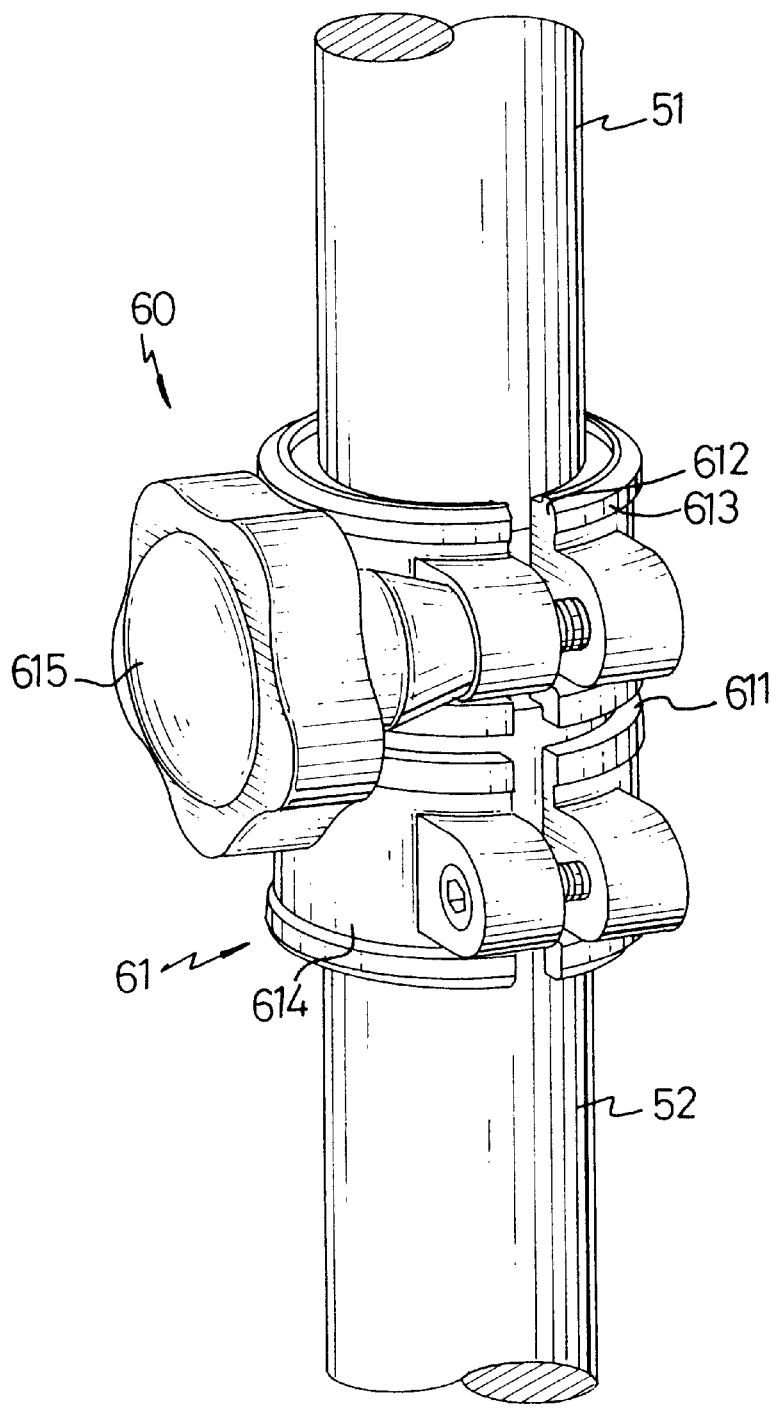
FIG. 5 is a perspective view of a conventional elevating device adapted to a telescopic tube.

With reference to FIG. 4, the handle (50) is replaced by a hand tool motor (70) so that the user is able to operate the elevation of the upper tube (51) more easily.

It is concluded that the present invention has the following advantages:

Using the worm gear and the worm shaft, the user is able to easily operate the movement of the upper tube relative to the lower tube with only one hand without worrying that the upper tube may fall into the lower tube.

Simple structure; the incorporation of the worm gear and the worm shaft is simple yet effective.

Double safety assurance; not only does the meshing of the worm shaft and the worm gear ensure that the upper tube is not going to fall into the lower tube, but also the positioning block secures the position of the upper tube.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. An elevating device in combination with a telescopic tube, the telescopic tube comprising a lower tube and an upper tube extendable into the lower tube and having a rack formed on a periphery of the upper tube, the elevating device comprising:

a casing with an upper opening defined to allow the upper tube to extend into the casing and a lower opening defined to communicate with the upper opening and allow the lower tube to extend into the casing;

a worm gear rotatably received in the casing to mesh the rack of the upper tube; and a worm shaft extending into the casing to mesh the worm gear so as to drive the movement of the upper tube relative to the lower tube; and, a handle mounted to connect to the worm shaft to displace the upper tube relative to the lower tube responsive to rotation of the handle; and, an adjusting knob with a positioning block securely attached to a distal end of the adjusting knob to detachably abut an outer periphery of the upper tube for positioning the upper tube relative to the lower tube.

2. The elevating device as claimed in claim 1, further comprising at least one boss formed on an inner periphery defining the upper opening and at least one channel formed on an outer periphery of the upper tube to correspond to the at least one boss such that the movement of the upper tube relative to the lower tube is smooth.

3. The elevating device as claimed in claim 2, wherein there are two oppositely formed bosses and two oppositely defined channels.

* * * * *